(12) United States Patent
Singer

(10) Patent No.: US 8,011,696 B2
(45) Date of Patent: Sep. 6, 2011

(54) BENT PRE-TENSIONER TUBE

(75) Inventor: Klaus-Peter Singer, Hamburg (DE)

(73) Assignee: Autoliv Development Ab, Vargarda (SE)

( * ) Notice: Subject to any disclaimer, the term of this patent is extended or adjusted under 35 U.S.C. 154(b) by 611 days.

(21) Appl. No.: 11/631,137

(22) PCT Filed: Jun. 17, 2005

(86) PCT No.: PCT/EP2005/006506
§ 371 (c)(1),
(2), (4) Date: May 29, 2009

(87) PCT Pub. No.: WO2006/002776
PCT Pub. Date: Jan. 12, 2006

(65) Prior Publication Data
US 2010/0037610 A1   Feb. 18, 2010

(30) Foreign Application Priority Data

Jul. 1, 2004   (DE) .......................... 10 2004 032 063

(51) Int. Cl.
*B60R 22/195* (2006.01)
(52) U.S. Cl. .......... 280/806; 280/807; 297/480; 60/632; 60/635
(58) Field of Classification Search .................. 280/806, 280/807; 296/479, 480, 468; 60/632–638; 297/468
See application file for complete search history.

(56) References Cited

U.S. PATENT DOCUMENTS

| | | | |
|---|---|---|---|
| 4,237,690 A | 12/1980 | Tsuge et al. | |
| 6,039,353 A * | 3/2000 | Bauer et al. | 280/806 |
| 6,149,242 A * | 11/2000 | Pesta et al. | 297/480 |
| 6,264,281 B1 * | 7/2001 | Dukatz et al. | 297/480 |
| 6,363,722 B1 * | 4/2002 | Takehara et al. | 60/632 |
| 6,446,897 B1 * | 9/2002 | Arima et al. | 242/374 |
| 7,118,132 B2 * | 10/2006 | Terasaki | 280/806 |
| 7,744,126 B2 * | 6/2010 | Durrer et al. | 280/806 |
| 7,832,768 B2 * | 11/2010 | Singer et al. | 280/806 |

(Continued)

FOREIGN PATENT DOCUMENTS

| | | |
|---|---|---|
| DE | 42 27 780 C2 | 5/2001 |
| DE | 10212912 A1 * | 10/2002 |
| DE | 102005041678 B3 * | 11/2006 |
| DE | 102006011830 B3 * | 8/2007 |
| EP | 1 344 697 A2 | 9/2003 |
| EP | 1 283 138 A1 | 12/2003 |
| JP | 06114452 A * | 4/1994 |
| JP | 2001212623 A * | 8/2001 |

OTHER PUBLICATIONS

Yamamoto et al., Forming Method for Pipe, Aug. 7, 2001, JPO, JP 2001-212623 A, English Abstract.*
Yamamoto et al., Forming Method for Pipe, Aug. 7, 2001, JPO, JP 2001-212623 A, Machine Translation of Description.*
Setsuo Katsumata, Bending Buckling Device of Tube, Apr. 26, 1994, JPO, JP 06-114452 A, English Abstract.*

(Continued)

*Primary Examiner* — Toan C To
*Assistant Examiner* — James English
(74) *Attorney, Agent, or Firm* — Brinks Hofer Gilson & Lione

(57) ABSTRACT

A pre-tensioning device for a seat belt with a piston which is guided in a bent tube, and which in case of triggering is influenced by gas generated by a gas generator located in one section of the tube, to which a cable led into the tube by a cable opening is attached. The gas generator section (12) of tube (10) which accommodates gas generator (16) is offset from the piston path section (11) of tube (10) which accommodates piston (17) by creation of a narrowed cross-section inside the tube with a defined gas flow path (29, 41).

11 Claims, 5 Drawing Sheets

U.S. PATENT DOCUMENTS

| | | | |
|---|---|---|---|
| 2002/0180202 A1* | 12/2002 | Krauss et al. | 280/806 |
| 2004/0041390 A1* | 3/2004 | Tomita | 280/806 |
| 2007/0069515 A1* | 3/2007 | Sakata | 280/806 |
| 2009/0134691 A1* | 5/2009 | Choi et al. | 297/480 |
| 2010/0090454 A1* | 4/2010 | Sugiyama et al. | 280/806 |
| 2010/0201179 A1* | 8/2010 | Yokote et al. | 297/480 |

OTHER PUBLICATIONS

Setsuo Katsumata, Bending Buckling Device of Tube, Apr. 26, 1994, JPO, JP 06-114452 A, Machine Translation of Description.*
Patent Abstracts of Japan, Nov. 19, 2002, Matsumoto Jukogyo KK NSK Autoliv Co. Ltd.

* cited by examiner

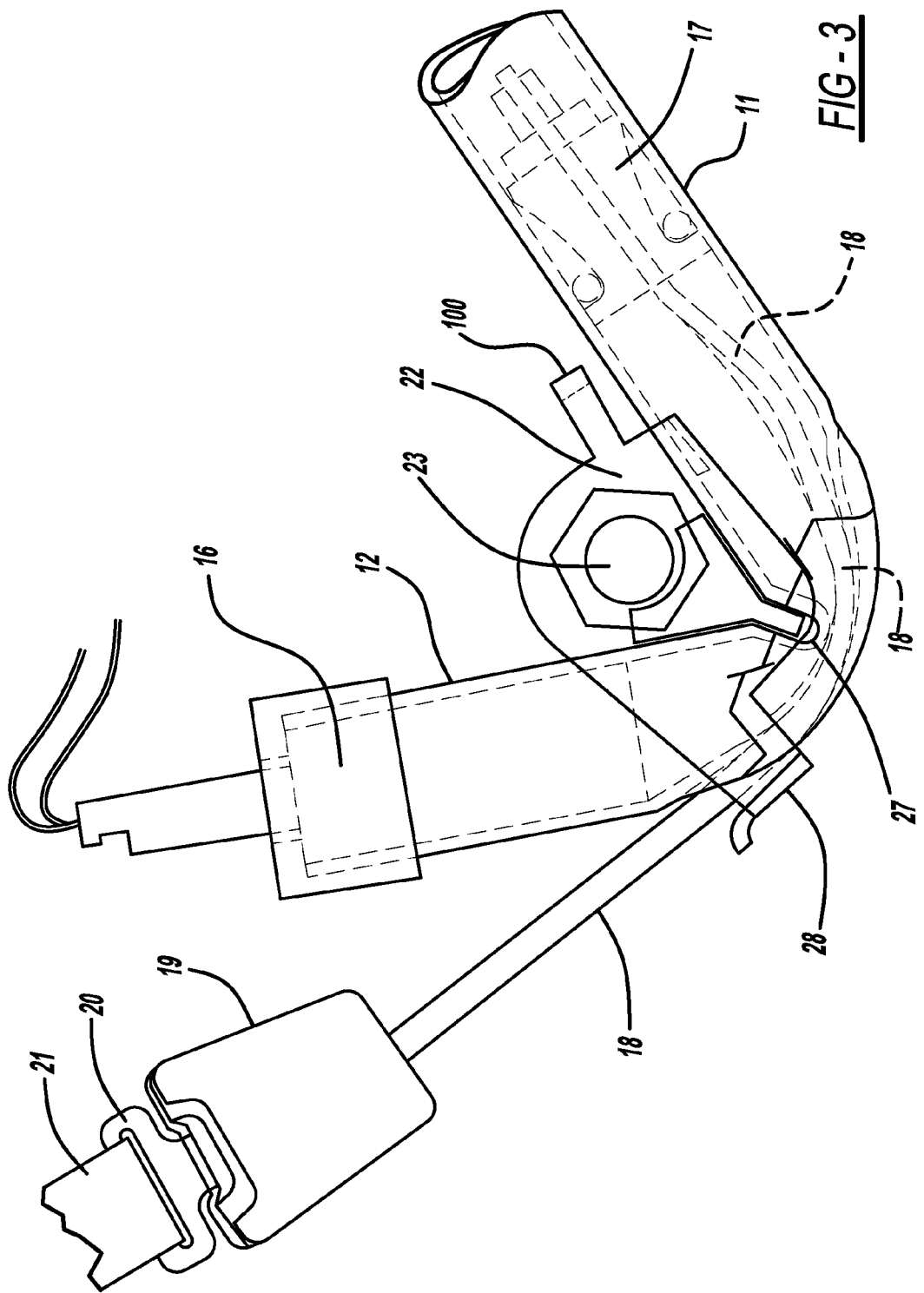

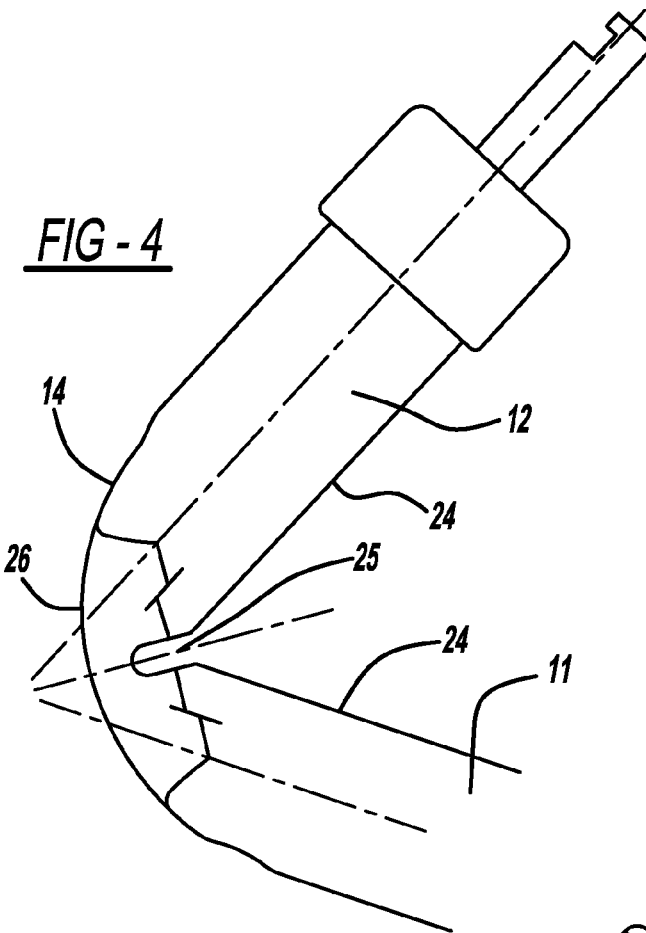
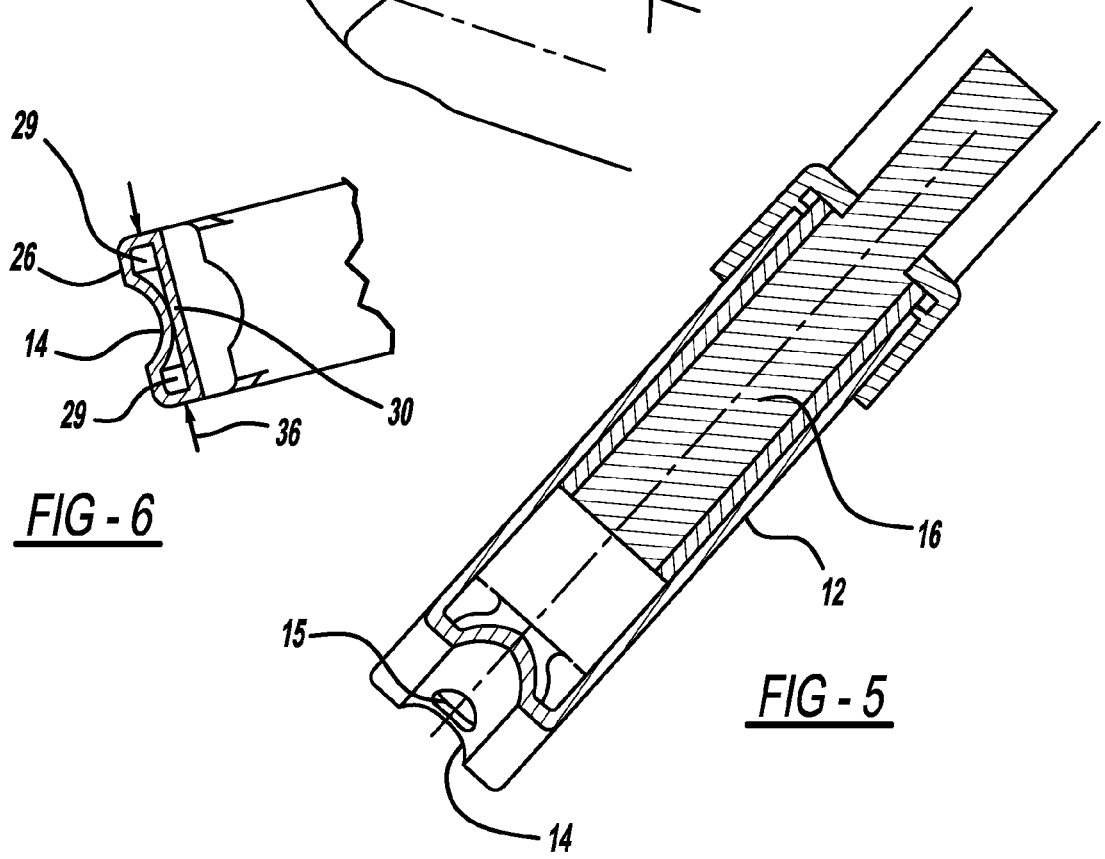

BENT PRE-TENSIONER TUBE

CROSS REFERENCE TO RELATED APPLICATIONS

This application claims priority to DE 10 2004 032 063.2, filed Jul. 1, 2004 and PCT/EP2005/006506, filed Jun. 17, 2005.

FIELD OF THE INVENTION

The invention relates to a pre-tensioning device for a seat belt with a piston, which is guided in a tube and which in case of triggering is forced to move by gas generated by a gas generator located in one section of the tube, to which a section of cable led into the tube through a cable opening is attached.

BACKGROUND OF THE INVENTION

A tensioning device with the aforementioned characteristics is described in EP 1 283 138 A1; the known pre-tensioning device consists of a tube which is bent for better packaging and assembly in the often limited space available in a motor vehicle for the accommodation of a drive which is necessary for the pre-tensioning process, which forms a straight section which accommodates a piston and therefore forms a piston path section, and a tube section which is offset in relation to the piston path which accommodates the gas generator. In the case of the embodiment shown in EP 1 283 138 A1, the pre-tensioning device is provided for a belt buckle, whereby the belt buckle is attached to a cable. The cable section is guided in an additionally provided cable guide area outside the belt tube, guided into the tube by means of a cable opening formed in the walls of the belt tube and is connected to the piston. Upon triggering, the gas generator generates a drive gas which streams through the bent area of the tube and drives the piston along the piston path, so that the cable connected to the piston is pulled into the bent tube. By these means, the belt buckle is pulled in the direction of the cable guide, tightening the seat belt connected to the belt buckle.

The known pre-tensioning device is associated with the disadvantage that the pressure of the gas generated by the gas generator is led directly to the piston through the section of the tube which has a constant cross-sectional shape. This means that the pressure peak which is created after ignition of the gas generator and before the movement of the piston necessitates sufficient strength of the drive cable and the connection of the cable with the piston as well as a correspondingly good seal of the cable entry into the tube, which gives rise to corresponding costs and effort when designing the known pre-tensioning device.

Therefore this invention is based on the task of designing a pre-tensioning device with the above-described generic characteristics in such a way that the complexity of loading of the drive cable and further components is reduced, while the pre-tensioning device is manufactured in a simple way.

SUMMARY OF THE INVENTION

The basic idea of the present invention is that the section of the pre-tensioner tube which accommodates the gas generator is offset from the piston path section of the tube which accommodates the piston by a narrowed internal cross-section area created in the tube at a bent section which has a defined gas flow path.

The invention involves the advantage that because of the separation of the section which accommodates the gas generator and the piston path section, a sufficiently large pressure can built up in the section for accommodating the gas generator in order to ensure clean and complete combustion of the material which creates the gas, even at low temperatures. Because of the restricted cross-sectional are of the gas flow path provided between the aforementioned sections of the tube, no pressure peak occurs in the piston path section, so that thinner drive cables can be used. The pressure losses which occur in the area of the cable seal are correspondingly less. A further advantage consists in the fact that the gas pressure which is developed in the piston path section which affects the piston is maintained over a longer period in an even fashion, as a gas stream is correspondingly fed in from the gas generator section in a regulated and continuous way. Based on the design of the narrowing of the cross-section of the bent section in relation to the tube which is used, adaptations in the design of the pre-tensioning device can easily be made to fit for application conditions within a seat belt system.

According to one embodiment of the invention it is intended that the narrowing of the cross-section of the tube in the bent section is effected by deforming the tube. This leads to the advantage of simple manufacturing of the pre-tensioning device without additional devices having to be inserted into the tube. According to alternative embodiments of the invention, the narrowing of the cross-section of the bent section can be achieved by means of rolling or bending of the tube.

In so far as, in a particular embodiment of the invention with a bending of the tube it is provided for that the tube is bent to form the bent section using suitable bending tubes which limit the width of the tube during the bending process in such a way that a hollow throat is impressed into the outer wall of the tube at the bent section which exhibits the larger bending radius, and the cable section is deflected via the bent section of the tube, the particular advantage results that because of the tube bend which is created in a particular way and the form of the bent section of the tube, the bent section itself forms the cable deflection guide, so that a separate cable guide as a component, and also mounting of such a separate component are not needed, in contrast to the state of the art. The pre-tensioning device can be manufactured with fewer components and therefore altogether more cost-effectively, and finally, the pre-tensioning device according to the invention is compact and can therefore be accommodated in a motor vehicle in space-saving fashion.

With regard to the form of the bent section, according to one embodiment of the invention it is provided that the inner wall of the tube is brought into contact at the inner side of the hollow throat impressed into the bent outer wall at its narrowest bent point with its inner side, and, in the ears formed on both sides of the narrow throat between the outer wall and inner wall, gas guide channels are formed for guidance of the gas from the section of the tube which accommodates the gas generator into the section of the tube which forms the piston path. Based on the bent section created in this way, defined cross-sections for the gas guide channels result, which is an advantage for the safe function of the pre-tensioning device.

According to one embodiment of the invention it is provided for that the inner included angle between the gas generator section and the piston path section of the tube is smaller than the deflection angle of the cable section, whereby in particular the included inner angle can be smaller than 90 degrees.

According to one embodiment of the invention it is provided for that the cable opening is located on an area of the tube bent section which faces the gas generator.

Furthermore it can be provided that in the included inner angle of the bent tube enclosed by the inner wall of the tube, fixing means are provided for a fixing part to be fixed to the associated vehicle.

According to one embodiment of the invention it is provided for that the fixing part reaches over the bent tube on the outside in its bent section and forms a guide for the cable section running in the hollow throat on the outer wall of the bent tube.

According to one embodiment of the invention it can be provided that the fixing part springs into the inner angle of the bent tube with an interference fit with a projection adapted to the shape of the inner wall of the bent tube which encloses the internal angle and supports the inner wall of the bent tube. This improves fixing of the bent tube and its design in general.

BRIEF DESCRIPTION OF THE DRAWINGS

Embodiments of the invention are shown in the drawings, which are described in the following text. The drawings are as follows:

FIG. 3 is an overall view of the pre-tensioning device as a buckle tensioner, FIG. 4 is a schematic side view of the bent area of the tube of the pre-tensioner shown in FIG. 1, FIG. 5 is a partial cross-section of the bent area of the tube of the pre-tensioner shown in FIG. 1, FIG. 6 is an enlarged cross-section of the bent area of the tube of the pre-tensioner shown in FIG. 1.

DETAILED DESCRIPTION OF THE INVENTION

Figure 1:
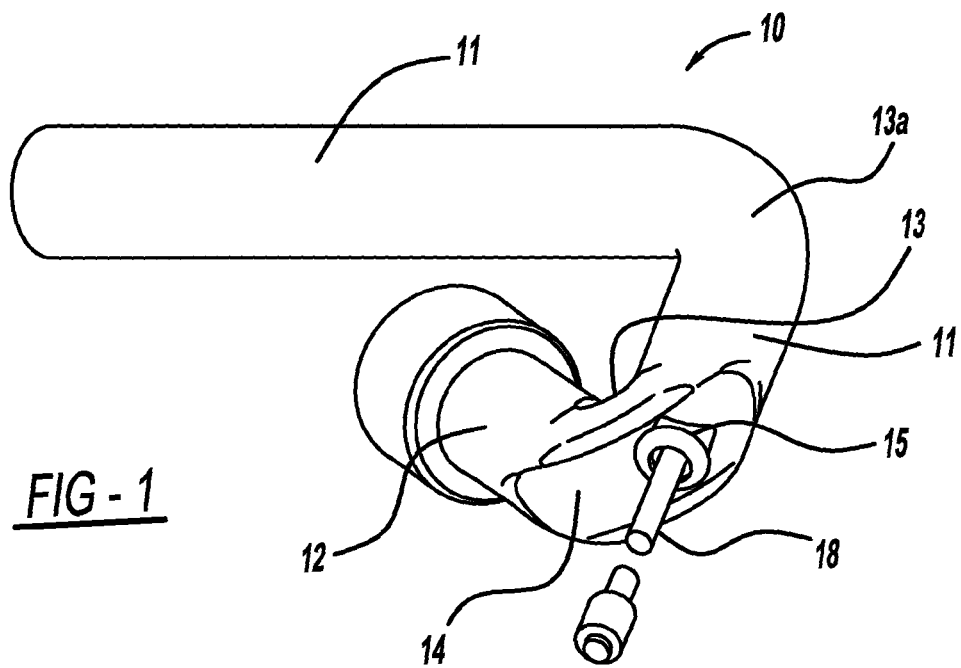
FIG. 1 is a perspective view of the bent tube of a pre-tensioning device in accordance with the present invention.
Figure 2:
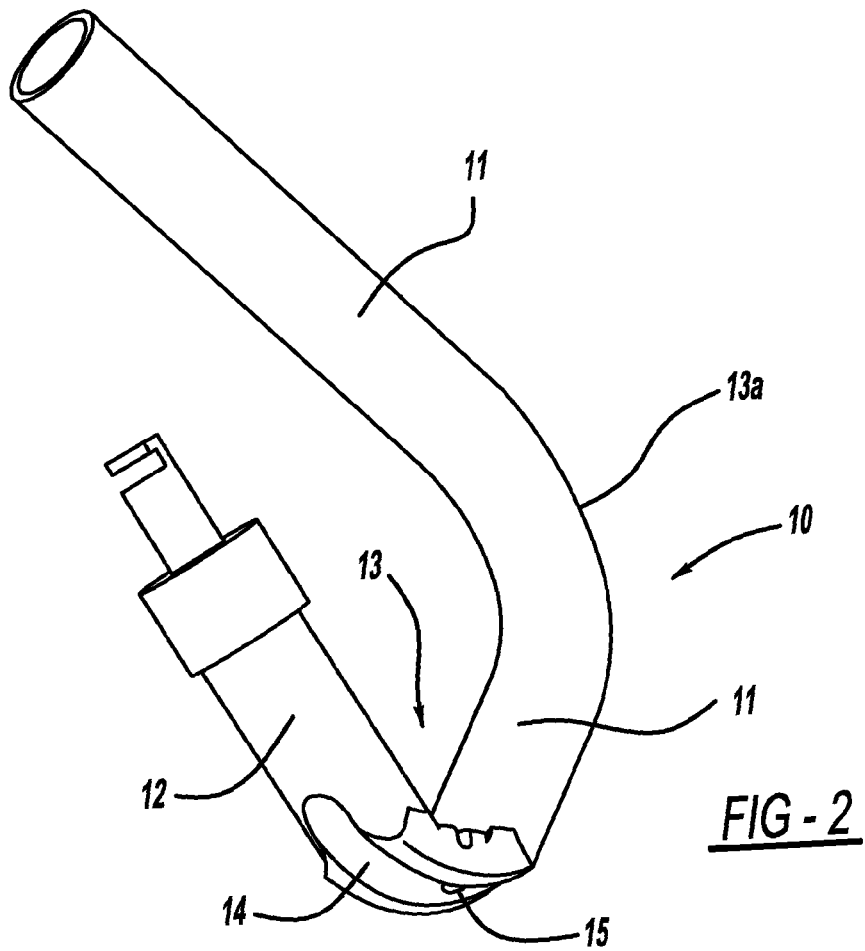
FIG. 2 is another perspective view of the device of FIG. 1.

First of all referring to FIGS. 1 and 2, a bent tube 10 can be recognised as a component of the drive for the pre-tensioning device shown as a whole in FIG. 3, whereby tube 10 shown in the embodiment forms a piston path section 11 forming a piston path and a gas generator section 12 which accommodates a gas generator. At bent section 13 which separates gas generator section 12 and piston path section 11 from one another, a narrowed cross-section is formed, with a defined flow path for gas generated by the gas generator 16 which is to be introduced into piston path section 11 is formed as gas guide channels 29 (FIG. 6). At bent section 13, a hollow throat 14 is impressed into the tube outer wall at the outside surface of the bend with the use of corresponding bending tools for creating the tube bend, and a cable opening 15 for insertion of a cable section is formed on the area of bent section 13 which faces gas generator section 12. In the embodiment shown, the tube section continuing on from bent section 13 of tube 10 is again bent at a further bent section 13a, which does not present an obstacle to the movement of the piston 17 in the piston path section 11. However, the form of bent section 13 is important for the realisation of the invention, and FIGS. 1 and 2 are intended to show that beyond bent section 13 of tube 10, further variations of the design of tube 10 with piston path section 11 are possible.

In FIG. 3, bent section 13 is now shown in detail along with tube sections 11 and 12. It can be recognised that in gas generator section 12, a gas generator 16 including corresponding ignition and feed devices is inserted and fixed.

A piston 17 is inserted in piston path section 11, to which a cable 18 is fixed. Cable 18 runs in the direction of the bent section 13 of tube 10, and passes through cable opening 15 out of tube 10 and then lies on hollow throat 14 formed as a cable guide in the outer wall of the bent tube at the outside of the bend of bent section 13 through the use of a corresponding bending tool. A belt buckle 19 is fixed to the free end of cable 18 in which a belt tongue 20 is hooked, onto which a seat belt 21 is connected.

A fixing part 22 is inserted into the pinched area enclosed by inner walls 24 at the inside of the bend of bent section 13 of the two tube sections 11, 12 of bent tube 10. Fixing part 22 can be fixed to a fixed part of the vehicle by means of a screw 23. Fixing part 22 is formed in such a way that it supports inner walls 24 of tube sections 11, 12 with an interference fit and engages with a projection 27 extending into the pinched area formed by the bending process by means of a correspondingly arranged bending tool and thereby fixes bent tube 10 securely to the motor vehicle. Fixing part 22 also reaches over bent tube 10 on its outer side and, in the area of the outer wall of the bent tube, additionally forms a guide 28 for cable 18 running in hollow throat 14. Based on the arrangement of fixing parts 22 in the pinched area enclosed between inner walls 24 of both tube sections 11 and 12, the necessary length of the pre-tensioning device is considerably reduced and the entire design and construction of the unit is made considerably simpler. In addition to projection 27, a tab 100 is additionally provided on fixing part 22 or other types of stepped additions can serve as anti-rotation devices in relation to the vehicle in order to fix the position of the pre-tensioning device.

As can be seen in FIGS. 4 through 6, the tube bend 10 is formed by use of corresponding bending tools in such a way that at the narrowest bending point the inner side of the associated inner wall 24 of bent tube 10 comes into contact with the inner side of the hollow throat 14 impressed into the bent inner wall 26 with its central area 30, so that ears are formed on both sides of impressed-in hollow throat 14, which form internal gas guide channels 29 for guidance of the gas from gas generator section 12 to piston path section 11 of tube 10. The cross-sectional flow area defined by gas guide channels 29 is less than the cross-sectional area of either of the sections 11 and 12. In order to achieve such a contour of the inner tube at the bent sections 13, when the tube is bent by means of the bending tools, the width of the tube may be limited by additional tools, as indicated by arrows 36 in FIG. 6. Bending of tube 10 forms an internal included angle 25 between tube sections 11 and 12. Preferably, the included angle formed by the bending of cable 18 is greater than that of angle 25.

Figure 7:
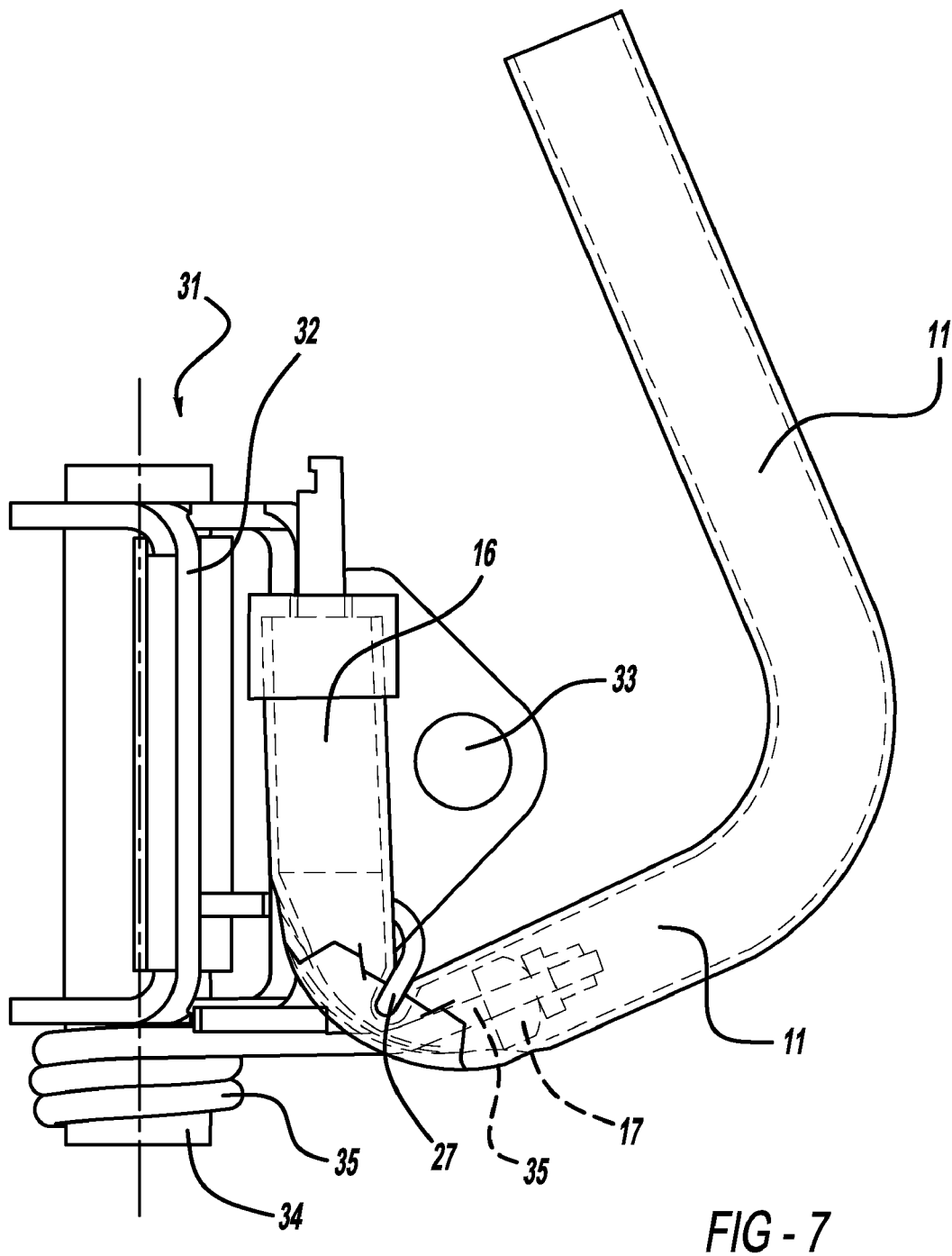
FIG. 7 is an overall view of a pre-tensioning device of this invention in the form of a spool pre-tensioner.

In FIG. 7, finally an embodiment of the invention is shown which makes it clear that the form of the drive device for the pre-tensioning device with bent tube 10 can also be provided or arranged for connection to a spool type pre-tensioner 31. In the case of such a spool pre-tensioner 31, the end of the belt strap, not further shown, is fixed to a spool or shaft 34 fixed in a housing 32, which is not turned when the seat belt is in normal use. Only when an accident is detected should the section of the safety belt connected to pre-tensioner 31 be tensioned, and for this purpose, shaft 34 arranged in housing 32 so as to be rotatable should begin to rotate. This occurs, as shown in FIG. 7, through the fact that a cable section 35 is wound onto a shaft extension, whose end is inserted into bent tube 10 in the way already described in FIG. 3 and is connected to piston 17 located there. When the gas generator 16 is triggered, the piston 17 is driven and unwinds cable section 35 from shaft 34, so that the shaft is turned in the tensioning direction for the seat belt.

As can be seen from FIG. 7, housing 32 is to be fixed to the vehicle by means of a fixing hole 33, whereby housing 32 forms projection 27 in integral form which projects into the pinched area 25 of bent section 13 and which therefore fixes the bent tube onto housing 32 of spool pre-tensioner 31.

Figure 8:
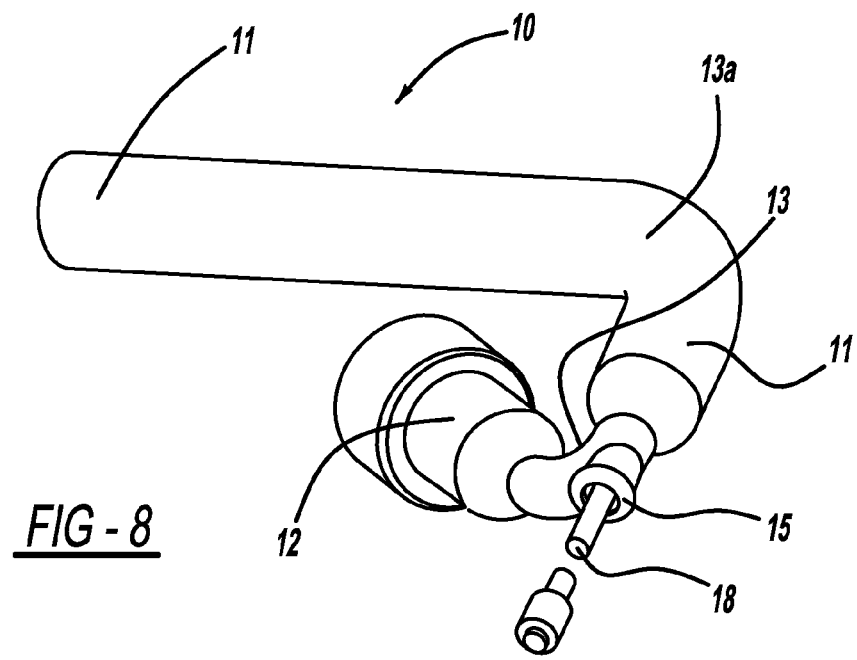
FIG. 8 shows the bent tube of a pre-tensioning device of this invention in a view according to FIG. 1 in an alternate embodiment.
Figure 9:
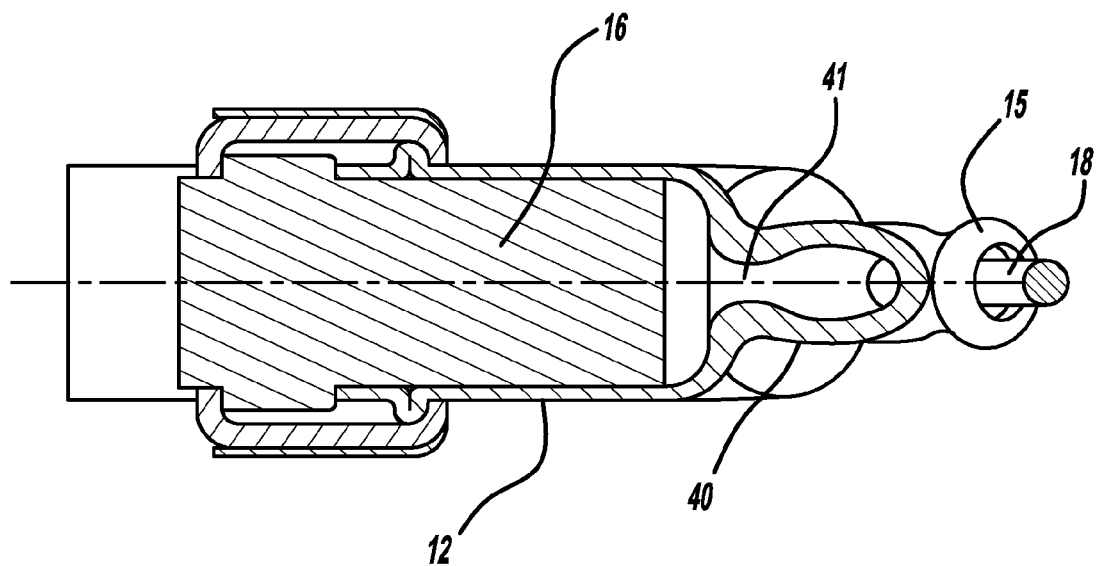
FIG. 9 shows the form of the narrowed cross-section in the tube according to FIG. 8 in an enlarged cross-section.

In the case of the embodiment shown in FIGS. 8 and 9, the corresponding narrowed cross-section in the area of bent section 13 is created by means of rolling or shaping, whereby a narrowed section 40 results with an flow path 41 in its interior.

While the above description constitutes the preferred embodiment of the present invention, it will be appreciated that the invention is susceptible to modification, variation and change without departing from the proper scope and fair meaning of the accompanying claims.

The invention claimed is:

1. A pre-tensioning device for a seat belt comprising a bent tube having a gas generator section and a piston path section with a bent section therebetween, a piston which is guided in the piston path section of the tube and which upon triggering is influenced to move by gas generated by a gas generator located in the gas generator section of the tube, a cable led into the tube through a cable opening and attached to the piston, the gas generator section of the tube being offset from the piston path section of the tube and the bent section forming a narrowed cross-section, relative to the gas generator section and the piston path section, inside the tube forming a gas flow path for the gas flowing from the gas generator section of the tube to the piston path section of the tube upon triggering of the gas generator, the tube bent section forming at its outer wall at the outside of the bend formed by the bent section a hollow throat forming a guide surface adjacent to the cable opening for guiding the cable along the bent section.

2. The pre-tensioning device according to claim 1, further comprising that the narrowed cross-section is created in the tube by means of deformation of the tube.

3. The pre-tensioning device according to claim 2, further comprising that the narrowed cross-section is created in the tube by deformation by rolling the tube.

4. The pre-tensioning device according to claim 2, further comprising that the narrowed cross-section is created in the tube by bending of the tube.

5. The pre-tensioning device according to claim 1, further comprising that the gas generator section and the piston path section of the tube include between each other an inner angle and the cable is bent around the bent section at an angle of deflection, the inner angle being smaller than the angle of deflection.

6. The pre-tensioning device according to claim 1, further comprising that the gas generator section and the piston path section of the tube include between each other an inner angle smaller than 90 degrees.

7. The pre-tensioning device according to claim 1, further comprising that the cable opening is arranged on the area of the bent section of the tube facing the gas generator section.

8. The pre-tensioning device according to claim 1, further comprising a fixing means for a fixing part which fixes tube to a vehicle and is affixed to the tube at the bent section.

9. The pre-tensioning device according to claim 8, further comprising that the fixing part reaches over the bent tube at the outside of the bent section and that a guide is formed on the fixing part for the cable running on the hollow throat.

10. A pre-tensioning device for a seat belt comprising a bent tube having a gas generator section and a piston path section with a bent section therebetween, a piston which is guided in the piston path section of the tube and which upon triggering is influenced to move by gas generated by a gas generator located in the gas generator section of the tube, a cable led into the tube through a cable opening and attached to the piston, the gas generator section of the tube being offset from the piston path section of the tube and the bent section forming a narrowed cross-section, relative to the gas generator section and the piston path section, inside the tube forming a gas flow path for the gas flowing from the gas generator section of the tube to the piston path section of the tube upon triggering of the gas generator, the tube bent section forming at its outer wall at the outside of the bend formed by the bent section a hollow throat forming a guide surface adjacent to the cable opening for guiding the cable, an inner wall of the tube at the inside of the bend formed by the bent section being in contact with the outer wall at its central area at a narrowest bending location of the bent section with the inner side of the hollow throat, the hollow throat forming the gas flow path on both sides of the hollow throat between the outer wall and the inner wall.

11. A pre-tensioning device for a seat belt comprising a bent tube having a gas generator section and a piston path section with a bent section therebetween, a piston which is guided in the piston path section of the tube and which upon triggering is influenced to move by gas generated by a gas generator located in the gas generator section of the tube, a cable led into the tube through a cable opening and attached to the piston, the gas generator section of the tube being offset from the piston path section of the tube and the bent section forming a narrowed cross-section, relative to the gas generator section and the piston path section, inside the tube forming a gas flow path for the gas flowing from the gas generator section of the tube to the piston path section of the tube upon triggering of the gas generator, the tube bent section forming at its outer wall at the outside of the bend formed by the bent section a hollow throat forming a guide surface adjacent to the cable opening for guiding the cable, and that a fixing part enters into the bent tube with a projection adapted to fit within a pinched area of an inner wall of the bent tube so as to form an interference fit and supports the inner wall of the bent tube.

* * * * *